United States Patent
Buthker (10) Patent No.: US 9,118,246 B2
(45) Date of Patent: Aug. 25, 2015

(54) CONTROL SYSTEM FOR MULTI OUTPUT DCDC CONVERTER

(75) Inventor: Henricus Cornelis Johannes Buthker, Mierlo (NL)

(73) Assignee: NXP B.V., Eindhoven (NL)

( * ) Notice: Subject to any disclaimer, the term of this patent is extended or adjusted under 35 U.S.C. 154(b) by 915 days.

(21) Appl. No.: 13/232,889

(22) Filed: Sep. 14, 2011

(65) Prior Publication Data

US 2012/0062031 A1  Mar. 15, 2012

(30) Foreign Application Priority Data

Sep. 15, 2010  (EP) ..................................... 10176782

(51) Int. Cl.
*H01F 38/00* (2006.01)
*H02J 1/00* (2006.01)
*H02M 3/158* (2006.01)
*H02M 1/00* (2007.01)

(52) U.S. Cl.
CPC ........ *H02M 3/158* (2013.01); *H02M 2001/009* (2013.01); *Y10T 307/406* (2015.04)

(58) Field of Classification Search
CPC ........................ H02M 2001/009; H02M 3/158
USPC ................. 307/31, 41; 323/344, 259, 282
See application file for complete search history.

(56) References Cited

U.S. PATENT DOCUMENTS

| | | | |
|---|---|---|---|
| 6,348,781 B1 * | 2/2002 | Midya et al. .................. 323/224 |
| 7,256,568 B2 * | 8/2007 | Lam et al. ..................... 323/222 |
| 7,268,525 B2 * | 9/2007 | Ishii et al. ..................... 323/282 |
| 7,432,614 B2 * | 10/2008 | Ma et al. ......................... 307/31 |
| 2004/0020128 A1 | 2/2004 | Ihashi | |
| 2007/0035282 A1 * | 2/2007 | Petersen ....................... 323/282 |
| 2008/0068866 A1 * | 3/2008 | Blanken .................... 363/21.01 |
| 2008/0231115 A1 | 9/2008 | Cho et al. | |
| 2010/0262308 A1 * | 10/2010 | Anderson et al. ............. 700/287 |
| 2011/0273151 A1 * | 11/2011 | Lesso et al. ................... 323/271 |
| 2012/0098428 A1 | 4/2012 | Koppelaar et al. | |
| 2012/0169246 A1 * | 7/2012 | Eddeane et al. .............. 315/276 |

FOREIGN PATENT DOCUMENTS

| | | |
|---|---|---|
| CN | 1980514 A | 6/2007 |
| CN | 101505098 A | 8/2009 |

OTHER PUBLICATIONS

Huang, M.-H. et al. "Single-Inductor Multi-Output (SIMO) DC-DC Converters with High Light-Load Efficiency and Minimized Cross-Regulation for Portable Devices", IEEE Journal of Solid-States Circuits, Vo. 11, No. 4, pp. 1099-1111 (Apr. 2009).

(Continued)

Primary Examiner — Jared Fureman
Assistant Examiner — Carlos Laguerre (57) ABSTRACT

A multi-output DC to DC converter can have complex control requirements in CCM mode because of the differing load requirements of the outputs. A multi-output DC to DC converter having a single coil or inductor and a freewheel switch is described. A controller measures the duration of the freewheel phase. The controller increases the current supplied to the DC to DC converter in the following duty-cycle if the duration is less than a first value, and decreases the current supplied to the inductor in the following duty-cycle if the duration is greater than a second value.

20 Claims, 5 Drawing Sheets (56) References Cited

OTHER PUBLICATIONS

Woo, Y.-J. et al. "Load-Independent Control of Switching DC-DC Converters with Freewheeling Current Feedback", IEEE Journal of Solid-State Circuits, vol. 43, No. 12, pp. 2798-2808 (Dec. 2008).

Ma, D. et al. "A Pseudo-CCM/DCM SIMO Switching Converter with Freewheel Switching", IEEE Journal of Solid-State Circuits, vol. 38, No. 6, pp. 1007-1014 (Jun. 2003).

Extended European Search Report for Patent Appln. No. 10176782.0 (Feb. 7, 2011).

* cited by examiner

CONTROL SYSTEM FOR MULTI OUTPUT DCDC CONVERTER

CROSS-REFERENCE TO RELATED APPLICATIONS

This application claims the priority under 35 U.S.C. §119 of European patent application no. 10176782.0, filed on Sep. 15, 2010, the contents of which are incorporated by reference herein.

FIELD OF INVENTION

This invention relates to DC-to-DC converters having multiple outputs.

BACKGROUND

It is known that switched-mode power supplies can be implemented with multiple outputs and using only one inductor for use as DC to DC converters. This saves on component count and reduces the numbers of pins required especially when an external compensation network is required for each converter.

A multiple output DC to DC converter is described by Woo et al in Load-Independent Control of Switching DC-DC Converters with Freewheeling Current Feedback by Young-Jin Woo, IEEE JOURNAL OF SOLID-STATE CIRCUITS, VOL. 43, No. 12, December 2008, page 2798.

US patent application 2008/0231115A1 describes a multiple output DC-DC converter that can work in both discontinuous conduction mode (DCM) and continuous conduction mode (CCM).

U.S. Pat. No. 7,432,614 B2 describes a single inductor multiple output switching DC-DC converter operating in pseudo-continuous conduction mode (PCCM) with freewheel switching. During a cycle of the multiple output switched mode supply, current is supplied to the inductor from a voltage source during one or more phases. Each of the multiple outputs is connected to the inductor during different phases of the cycle which may or may not by the same phases when the current is supplied to the inductor. Once an output has reached the required voltage the output is disconnected from the inductor and a next output is switched in to connect to the inductor. Once the final output has reached the required voltage then the inductor can be switched to free-wheel by a switch which can couple the two terminals of the inductor together until the beginning of the next cycle. The control of the current supplied to the inductor is done by a controller using sensors to determine the currents in the output loads, the switches and the inductor. The value of the sensed current can be used to modify the level of freewheel current.

A problem with multiple output DC to DC converters is the mutual influence of the outputs. Since all outputs share the same inductor, which has a limited amount of electrical energy, if one output has a load step and suddenly needs more energy, the other outputs will have less energy available. Another problem is determining which parameter or parameters the controller should use for input and what parameters to control. For converters operating in DCM mode, the control is simple, because the current in the inductor is allowed to return to zero or cross zero at the end of each cycle. However, in CCM mode the control is much more complex than DCM mode, because the current has to be maintained it a different value depending on the varying load requirements of the multiple outputs. It is therefore desirable to develop a simpler DC-to-DC converter for operation in CCM mode.

SUMMARY OF INVENTION

Various aspects of the invention of the invention are defined in the accompanying claims. In a first aspect there is provided a multiple-output DC-to-DC converter comprising an inductor having a first inductor terminal and a second inductor terminal; a current controller coupled to the inductor; a freewheel switch operable to couple the first inductor terminal to the second inductor terminal during a freewheel phase of the multi-output switched-mode power supply; a controller having a first controller output coupled to the freewheel switching mechanism and a second controller output coupled to the current controller; wherein the controller is operable to measure a duration of the freewheel phase and to modify the current supplied to the inductor dependent on the duration of the freewheel phase.

The invention is based on the realization that the duration of the free-wheel phase of a cycle of the DC-to-DC converter can be used to control the amount of current supplied to the inductor when the converter is operating in a CCM mode, since the longer the duration of the freewheel phase, the more energy there is in the system. Hence, if the freewheel phase is very long, then there is too much energy in the system, so the inductor current can be smaller. If the freewheel phase is very short, then there is too little energy in the system leaving no headroom for positive transients, hence the inductor current can be larger. Using the duration of the freewheel phase as a control parameter for the controller simplifies the design of the DC-to-DC converter, because it removes the requirement for load current sensors. The measurement of the duration of the freewheel phase can be done by a simple digital implementation such as a counter, or other simple digital design.

In an embodiment there is provided a multiple-output DC-to-DC converter wherein the controller is further adapted to increase a peak current supplied to the inductor by the current control mechanism when the duration of the freewheel phase is less than a first value, and decrease the peak current supplied to the inductor by the current control mechanism when the duration of the freewheel phase is greater than a second value. By controlling the peak current value supplied to the inductor, the amount of energy supplied to the inductor can be limited.

In another embodiment there is provided a buck-boost converter comprising a DC to DC converter wherein the freewheel switching mechanism comprises: a first transistor having a first transistor terminal coupled to the first terminal of the inductor, and a second transistor terminal coupled to a reference ground potential; and a second transistor having a first transistor terminal coupled to the second terminal of the inductor and a second transistor terminal coupled to the reference ground potential; wherein the first transistor is operable to be enabled during a first phase of a buck-boost cycle, the second transistor operable to be enabled during a second phase of the buck-boost cycle and both the first transistor and the second transistor are operable to be enabled during the freewheel phase of the buck-boost cycle. Controlling the two transistors during the different phases of the buck-boost cycle eliminates the requirement to have a separate free-wheel switch resulting in a design with reduced component count.

In a second aspect there is provided a method of controlling a multiple-output DC-to-DC converter having an inductor and operable in a continuous conduction mode, the method comprising: determining the duration of a freewheel phase; modifying the current supplied to the inductor dependent on the duration of the freewheel phase. By using the value of the duration of the freewheel phase as a control parameter, the control algorithm is simplified because the current load on each of the multiple outputs and the switching currents do not need to be measured.

Embodiments of the invention will now be described in detail illustrated by way of example only by the accompanying drawings in which.

DESCRIPTION

Figure 1:
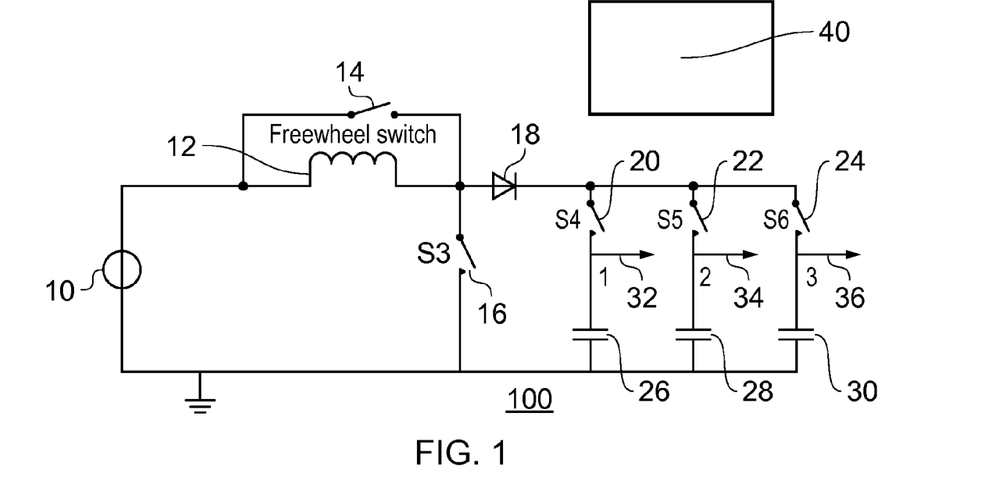
FIG. 1 illustrates a multi-output DC to DC converter configured as a boost converter according to an embodiment of the invention.

FIG. 1 shows a DC to DC converter, implemented as a multiple output boost converter 100. Boost converter 100 has a DC voltage source 10 connected to a first terminal of an inductor 12. Freewheel switch 14 can be connected between a first terminal and a second terminal of inductor 12. The second terminal of the inductor 12 can be connected to a first terminal of boost input switch 16. A second terminal of boost input switch 16 can be connected to a reference potential which can be a ground potential.

Diode 18 can have an anode coupled to the second terminal of the inductor 12, and a cathode coupled to a first terminal of first output switch 20, a first terminal of second output switch 22, and first terminal of third output switch 24. A second terminal of first output switch 20 can be coupled to a first terminal of capacitor 26, a second terminal of capacitor 26 can be coupled to a reference potential which can be a ground potential. A first terminal of second output capacitor 28 is coupled to a second terminal of second output switch 22, and a second terminal of capacitor 28 is coupled to a reference potential. A second terminal of third output switch 24 is coupled to a first terminal of capacitor 30, and a second terminal of capacitor 30 is coupled to a reference potential.

First output switch 20, second output switch 22 and third output switch 24 can be operated as a selector to select which of the outputs are coupled to inductor 12.

A first output 32 of the boost converter 100 can be coupled to the second terminal of first output switch 20. A second output 34 of the boost converter 100 can be coupled to the second terminal of the second output switch 22. A third output 36 of the boost converter 100 can be coupled to the second terminal of the third output switch 24. Controller 40 can be coupled to freewheel switch 14, boost input switch 16, and first output switch 20, second output switch 22, and third output switch 24. Controller 40 can control the switching of freewheel switch 14, boost input switch 16, first output switch 20, second output switch 22, and, third output switch 24 of the boost converter 100 during each cycle of its operation.

Free wheel switch 14, boost input switch 16, first output switch 20, second output switch 20, and third output switch 24, can be implemented as transistors. The transistors can be bi-polar transistors or FET's.

Figure 2:
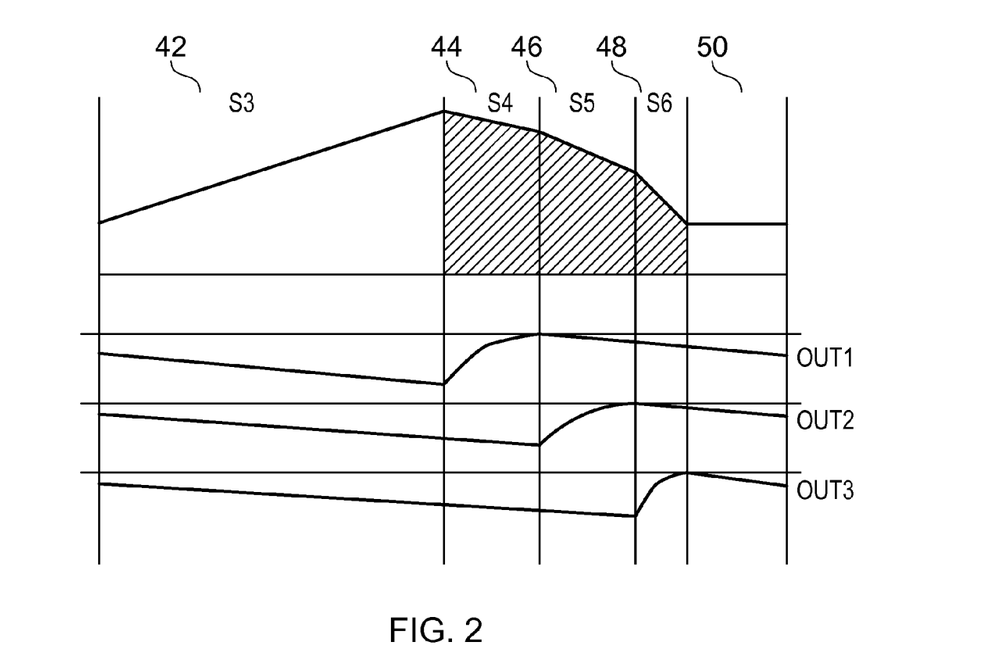
FIG. 2 shows the current variation during the phases of a single cycle of operation of the boost converter of FIG. 1.

FIG. 2 illustrates an example of a cycle of operation of the boost converter 100 operating in a continuous conduction mode. During a first phase 42 of the cycle, boost input switch 16 can be closed by the controller 40. Freewheel switch 14, first output switch 20, second output switch 22, and third output switch 24, can be left open by the controller 40. Current can be supplied to the inductor 12 by the voltage source 10, and the voltage at the second terminal of the inductor 12 will steadily increase.

The voltage source 10 and input switch 16 can be used as a current controller since the duration of phase 42 determines the amount of current supplied to the inductor.

In a second phase 44 of a cycle of the boost converter 100, boost input switch 16 can be open, first output switch 20 can be closed, second output switch 22 can be open, third output switch 24 can be open, and freewheel switch 14 can be open. During the second phase 44, energy stored in inductor 12 can be supplied to the first output 32. The voltage at output 32 can steadily increase up to a predefined value. Once the predefined value has been reached, the controller 40 can open circuit first output switch 20.

In a third phase 46 of the cycle of the boost converter 100, freewheel switch 14 can be open, boost input switch 16 can be open, first output switch 20 can be open, second output switch 22 can be closed, third output switch 24 can be open. In third phase 46 of the cycle of the boost converter 100, energy can be supplied from inductor 12 to the second output 34, and the voltage on second output 34 can increase up to a desired value. Once the desired value has been reached, the controller 40 can open circuit second output switch 22 which disconnects the inductor 12 from the second output 34.

In a further phase 48 of the cycle of the boost converter 100, input switch 16 can be open freewheel switch 14 can be open, first output switch 20 can be open, second output switch 22 can be open, and third output switch 24 can be closed. In further phase 48 of the cycle of operation of the boost converter 100, the third output 36 is coupled to inductor 12. Energy stored in the inductor 12 can be transferred to the third output 36, and the voltage at output 36 will rise up to a predetermined value. Once the predetermined value has been reached, the controller 40 can open circuit third output switch 24.

Freewheel phase 50 of the cycle of the operation of the boost converter 100 can have freewheel switch 14 closed, input switch 16 open, first output switch 20 open, second output switch 22 open, and third output switch 24 open. During freewheel phase 50, any energy stored in the inductor 12 after all outputs of the multi output boost converter 100 have reached their required voltage levels can be circulated in a current loop including the inductor 12, until the start of the next cycle of operation of the multi output boost converter 100.

Figure 3:
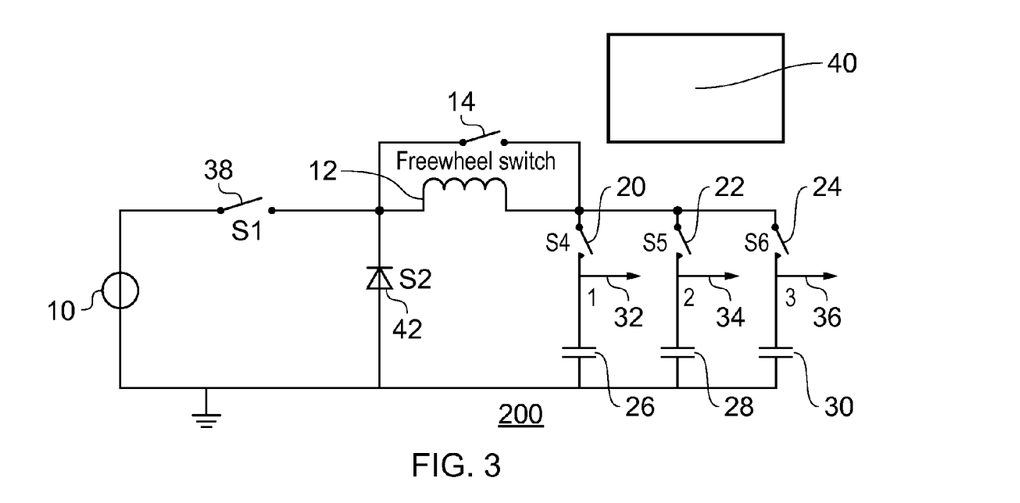
FIG. 3 illustrates a multi-output DC to DC converter configured as a buck converter according to a further embodiment of the invention.

FIG. 3 shows a DC to DC converter, implemented as a multiple output buck converter 200. Buck converter 200 has a DC voltage source 10 which can be connected to a first terminal of a buck input switch 38. A first terminal of inductor 12 can be connected to a second terminal of buck input switch 38. Diode 42 can have a cathode coupled to the first terminal of the inductor 12, and an anode coupled to a reference potential which can be a ground potential.

Freewheel switch 14 can be connected between the first terminal and a second terminal of inductor 12. Second terminal of inductor 12 can be connected to a first terminal of first output switch 20, a first terminal of second output switch 22, and first terminal of third output switch 24. A second terminal of first output switch 20 can be coupled to a first terminal of capacitor 26, a second terminal of capacitor 26 can be coupled to a reference potential which can be a ground potential. A first terminal of second output capacitor 28 can be coupled to a second terminal of second output switch 22, and a second terminal of capacitor 28 can be coupled to a reference potential. A second terminal of third output switch 24 can be coupled to a first terminal of capacitor 30, and a second terminal of capacitor 30 is coupled to a reference potential.

A first output 32 of the buck converter 200 can be coupled to the second terminal of first output switch 20. A second output 34 of the buck converter 200 can be coupled to the second terminal of the second output switch 22. A third output 36 of the buck converter 200 can be coupled to the second terminal of the third output switch 24. Controller 40 can be coupled to freewheel switch 14, buck input switch 38, first output switch 20, second output switch 22, and third output switch 24. Controller 40 can control the switching of freewheel switch 14, buck input switch 16, first output switch 20, second output switch 22, and, third output switch 24 of the buck converter 200 during each cycle of its operation.

Free wheel switch 14, input switch 38, first output switch 20, second output switch 22, and third output switch 24, can be implemented using transistors or a combination of transistors or diodes. The transistors can be bi-polar transistors or FETs. FETs can be implemented as MOSFET transistors. First output switch 20, second output switch 22, and third output switch 24 can include a diode for reverse blocking to prevent shorting between the outputs. The diode can be formed separately or as part of a MOSFET transistor structure. Switches can be implemented using more than one transistor.

Figure 4:
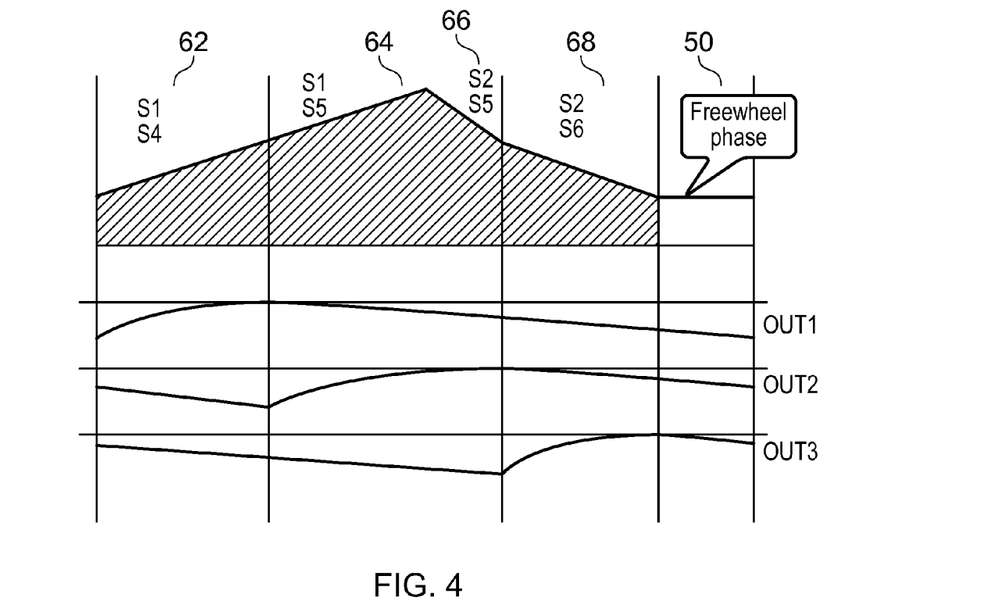
FIG. 4 shows the current variation during the phases of a single cycle of operation of the buck converter of FIG. 3.

FIG. 4 illustrates an example of a cycle of operation of the buck converter 200. During a first phase 62 of the cycle, buck input switch 38 and first output switch 20 can be closed by the controller 40. Freewheel switch 14, second output switch 22, and third output switch 24, can be left open by the controller. Current can be supplied to the inductor 12 by the voltage source 10, and the voltage at the second terminal of the inductor 12 can increase until a reference value for the voltage at first output 32 is reached, at which point the controller 40 can open first output switch 20.

In a second phase 64 of a cycle of the buck converter 200, buck input switch 38 can be closed, first output switch 20 can be open, second output switch 22 can be closed, third output switch 24 can be open, and freewheel switch 14 can be open. During the second phase 64, energy stored in inductor 12 or supplied by the voltage source 10 can be supplied to the second output 34. The voltage at second output 34 can increase.

The voltage source 10 and buck input switch 38 can be used as a current controller since the duration of phase 62 and 64 determines the amount of current supplied to inductor 12 in a cycle of the buck converter 200.

In a third phase 66 of a cycle of the buck converter 200 freewheel switch 14 can be open, input switch 38 can be open, first output switch 20 can be open, second output switch 22 can be closed, third output switch 24 can be open. In third phase 66 of the cycle of the buck converter 200, energy can be supplied from inductor 12 to the second output 34, and the voltage on second output 34 can increase up to a desired value. Once the desired value has been reached, the controller 40 can open circuit second output switch 22 which disconnects the inductor 12 from the second output 34.

In a further phase 68 of a cycle of the buck converter 200, buck input switch 38 can be open, freewheel switch 14 can be open, first output switch 20 can be open, second output switch 22 can be open, and third output switch 24 can be closed. In further phase 68 of a cycle of operation of the buck converter 200, the third output 36 is coupled to inductor 12. Energy stored in the inductor 12 can be transferred to the third output 36, and the voltage at output 36 will rise up to a predetermined value. Once the predetermined value has been reached, the controller 40 can open circuit third output switch 24.

Freewheel phase 50 of the cycle of the operation of the multi output of the buck converter 200 can have freewheel switch 14 closed, buck input switch 38 open, first output switch 20 open, second output switch 22 open, and third output switch 24 open. During freewheel phase 50, energy stored in the inductor 12 after all outputs of the multi output buck converter 200 have reached their required voltage levels can be circulated in a current loop, including inductor 12, until the start of the next cycle of operation of the buck converter 200.

Figure 5:
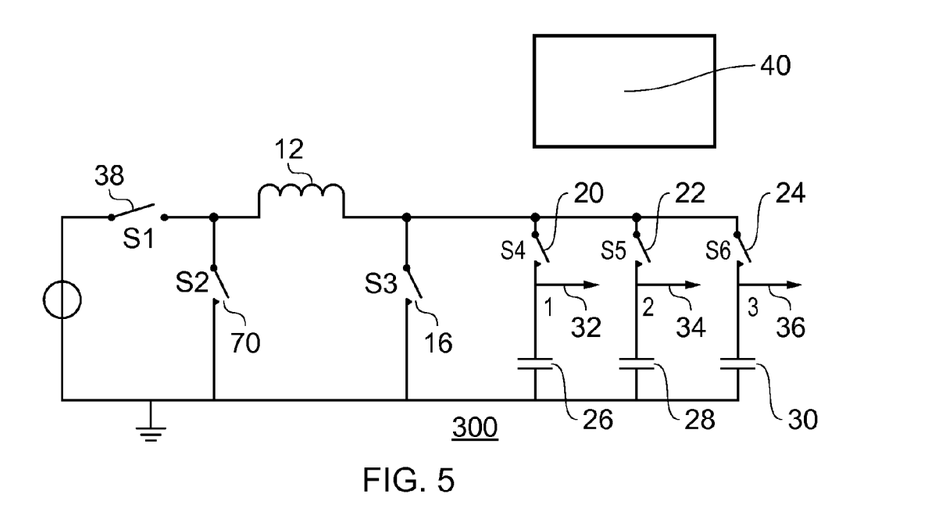
FIG. 5 illustrates a multi-output DC to DC converter configured as a buck-boost converter according to a further embodiment of the invention.

FIG. 5 shows a DC to DC converter, implemented as a multiple output buck-boost converter 300. Buck boost converter 300 has a DC voltage source 10 which can be connected to a first terminal of a buck input switch 38. A first terminal of inductor 12 can be connected to a second terminal of buck input switch 38. The second terminal of the inductor 12 can be connected to a first terminal of boost input switch 16. A second terminal of boost input switch 16 can be connected to a reference potential which can be a ground potential. Buck-boost input switch 70 can have a first terminal coupled to the first terminal of the inductor 12, and a second terminal coupled to a reference potential which can be a ground potential.

Second terminal of inductor 12 can be connected to a first terminal of first output switch 20, a first terminal of second output switch 22, and first terminal of third output switch 24. A second terminal of first output switch 20 can be coupled to a first terminal of capacitor 26, a second terminal of capacitor 26 can be coupled to a reference potential which can be a ground potential. A first terminal of second output capacitor 28 can be coupled to a second terminal of second output switch 22, and a second terminal of capacitor 28 can be coupled to a reference potential. A second terminal of third output switch 24 can be coupled to a first terminal of capacitor 30, and a second terminal of capacitor 30 is coupled to a reference potential.

A first output 32 of the buck-boost converter 300 can be coupled to the second terminal of first output switch 20. A second output 34 of the buck-boost converter 300 can be coupled to the second terminal of the second output switch 22. A third output 36 of the buck-boost converter 300 can be coupled to the second terminal of the third output switch 24. Controller 40 can be coupled to buck input switch 38, first output switch 20, second output switch 22, and third output switch 24. Controller 40 can control the switching of boost input switch 16, buck input switch 38, buck-boost input switch 70, first output switch 20, second output switch 22, and third output switch 24 of the buck-boost converter 300 during each cycle of operation.

Boost input switch 16, buck input switch 38, buck-boost input switch 70, first output switch 20, second output switch 22 and third output switch 24 can be implemented using transistors or a combination of transistors or diodes. The transistors can be bi-polar transistors or FETs. FETs can be implemented as MOSFET transistors. First output switch 20, second output switch 22, and third output switch 24 can include a diode for reverse blocking to prevent shorting between the outputs. The diode can be formed separately or as part of a MOSFET transistor structure. Switches can be implemented using more than one transistor.

Figure 6:
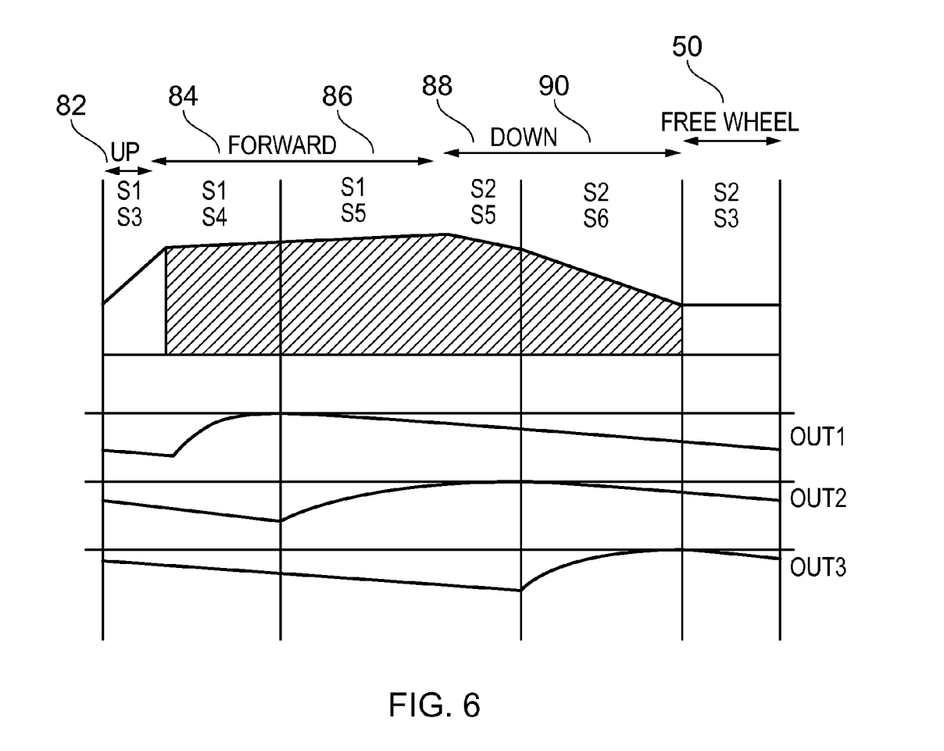
FIG. 6 shows the current variation during the phases of a single cycle of operation of the buck-boost converter of FIG. 6.

FIG. 6 illustrates an example of a cycle of operation of the Buck-boost converter 300. During a first phase 82 of a cycle, buck input switch 38, and boost input switch 16 can be closed by the controller 40. Buck-boost input switch 70, first output switch 20, second output switch 22, third output switch 24 can be left open by the controller. Current can be supplied to the inductor 12 by the voltage source 10, and the voltage at the second terminal of the inductor 12 can increase.

In a second phase 84 of a cycle of the buck-boost converter 300, buck input switch 38 can be closed, first output switch 20 can be closed, second output switch 22 can be open, third output switch 24 can be open, and buck-boost input switch 70 can be open. During the second phase 84, energy stored in inductor 12 or supplied by the voltage source 10 can be supplied to the first output 32. The voltage at second output 32 can increase until a predetermined reference value at which point the controller 40 can open first output switch 20.

In a third phase 86 of a cycle of a buck-boost converter 300, buck input switch 38 can be closed, boost input switch 16 can be open, first output switch 20 can be open, second output switch 22 can be closed, third output switch 24 can be open. In third phase 86 of the cycle of the buck-boost converter 300, energy can be supplied from inductor 12 or the voltage source 10 to the second output 34, and the voltage on second output 34 can increase up to a desired value. Once the desired value has been reached, the controller 40 can open circuit second output switch 22 which disconnects the inductor 12 from the second output 34.

The voltage source 10, boost input switch 16 and buck input switch 38 can be used as a current controller since the duration of phase 62 and 64 determines the amount of current supplied to inductor 12 in a cycle of the buck-boost converter. 300.

In a fourth phase 88 of a cycle of the buck-boost converter 300, boost input switch 16 can be open, buck input switch 38 can be open, buck-boost input switch 70 can be closed, first output switch 20 can be open, second output switch 22 can be closed, and third output switch 24 can be open. In fourth phase 88 of a cycle of operation of the buck converter 300, the second output 34 is coupled to inductor 12. Energy stored in the inductor 12 can be transferred to the second output 34, and the voltage at output 34 can rise up to a predetermined value. Once the predetermined value has been reached, the controller 40 can open circuit second output switch 22.

In a fifth phase 90 of a cycle of the buck-boost converter 300, boost input switch 16 can be open, buck input switch 38 can be open, buck-boost input switch 70 can be closed, first output switch 20 can be open, second output switch 22 can be open, and third output switch 24 can be closed. In fifth phase 90 of a cycle of operation of the buck converter 300, the third output 36 can be coupled to inductor 12. Energy stored in the inductor 12 can be transferred to third output 36, and the voltage at third output 36 can rise up to a predetermined value. Once the predetermined value has been reached, the controller 40 can open circuit third output switch 24.

In freewheel phase 50 of the cycle of the operation of the multi output of the buck converter 200 boost input switch 16 can be closed, buck input switch 38 can be open, buck-boost input switch 70 can be closed, first output switch 20 can be open, second output switch 22 can be open, and third output switch 24 can be open. During freewheel phase 50, energy stored in the inductor 12 after all outputs of the multi output buck-boost converter 300 have reached their required voltage levels can be circulated in a current loop, including inductor 12, until the start of the next cycle of operation of the buck-boost converter 300. In freewheel phase 50, boost input switch 16 and buck-boost switch 70 act as a freewheel switch coupling the terminals of inductor 12 together.

Figure 7:
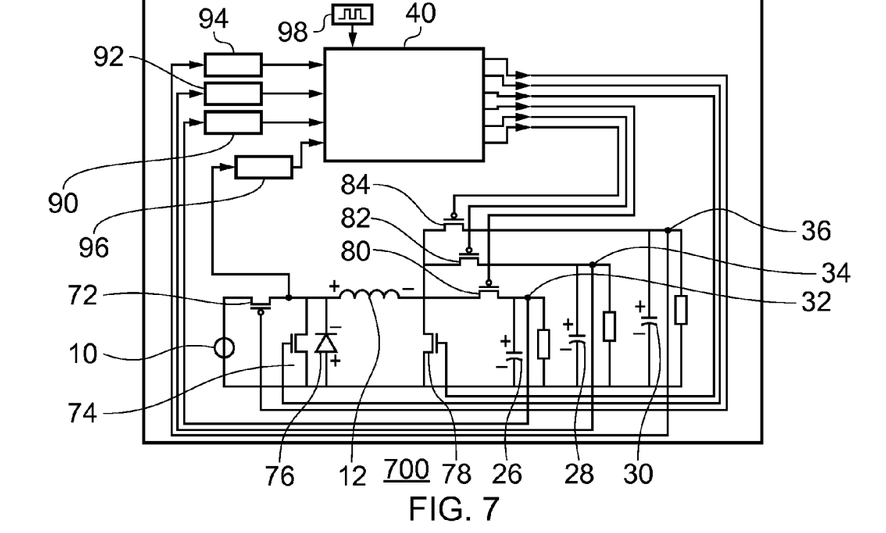
FIG. 7 illustrates a multi-output DC to DC converter configured as a buck-boost converter according to a further embodiment of the invention.

FIG. 7 shows a multi output buck boost converter 700 which implements a function of a DC to DC converter. Voltage source 10 can be coupled to the source of PMOS transistor 72. The drain of PMOS transistor 72 can be coupled to the drain of NMOS transistor 74. The source of NMOS transistor 74 can be coupled to the ground reference potential. The drain of NMOS transistor 72 can be coupled to the cathode of diode 76. The anode of diode 76 can be coupled to a ground reference potential. First terminal of inductor 12 can be connected to the drain of NMOS transistor 72. Second terminal of inductor 12 can be connected to the drain of NMOS transistor 78.

First PMOS output transistor 80 can have a source coupled to the second terminal of inductor 12 and drain coupled to the first output 32. Second PMOS output transistor 82 can have a source coupled to the second input terminal of inductor 12 and drain coupled to second output 34. Third PMOS output transistor 84 can have drain connected to second terminal of inductor 12 and source connected to third output 36 of the buck-boost converter 700. First output capacitor can be connected between first output 32 and ground reference potential. Second output capacitor 28 can be connected between second output 34 and ground reference potential. Third output capacitor 30 can be connected between third output 36 and ground reference potential.

First output comparator 90 can have an input coupled to first output 32 and second input coupled to a reference voltage equal to the desired output voltage of first output 32. Second comparator 92 can have a first input coupled to the second output 34 and a second input coupled to a reference voltage equal to the desired output voltage of second output 34. A third comparator 94 can have first input coupled to the third output 36 and of the buck-boost converter 700 and a second output coupled to a reference voltage which is equal to the desired output voltage of the third output 36. Current limit comparator 96 can have an input coupled to the first terminal of inductor 12 and a second input coupled to an output of the digital controller which sets the comparator to the desired value of peak current.

Controller 40 can have an input coupled to a clock reference source 98, a second input coupled to output of comparator 90, a third input coupled to output comparator 92 and a fourth input coupled to output of comparator 94. Controller 40 has a further input coupled to an output of current limit comparator 96. Further embodiments can have a clock reference source 98 operable at frequencies between 1 MHz and 100 MHz Controller 40 can have a first output coupled to a gate input of PMOS transistor 72, a second output which can be connected to a gate input of NMOS transistor 74, a third output which can be connected to a gate input of NMOS transistor 78, a fourth output which can be connected to first PMOS output transistor 80, a fifth output which can be connected to a gate input of second PMOS output transistor 82, and a sixth output which can be connected to a gate input of third output PMOS transistor 84. PMOS output transistor 80, PMOS output transistor 82 and PMOS output transistor 84 can incorporate a diode for reverse blocking to avoid short circuits between multiple outputs. A further output of the digital controller 40 can be connected to the current limit comparator 96.

The PMOS and NMOS transistors in the buck-boost converter can be controlled by the controller 40 and act as switches. In operation, the controller 40 can first switch on PMOS transistor 72 together with NMOS transistor 78; this energises the coil by connecting the coil to the voltage supply of voltage source 10.

Next NMOS transistor 78 is switched off and PMOS transistor 32 is switched on which couples the second terminal of coil 12 to first output of the buck-boost converter 700. Comparator 90 can compares the output voltage 30 of first output 32 with the desired referenced voltage. Once the desired reference voltage has been reached for first output 32, the output of the comparator 90 will change to logic one and the digital controller can switch off first PMOS output transistor 32 and switch on second PMOS transistor 34. This can couple the second terminal of inductor 12 to the second output 34. The voltage output of the second output 34 will then increase to a level determined by the reference input to the second comparator 92. Once the voltage is slightly greater than the reference voltage input to the second comparator 92 the output of the comparator will go high and the digital controller can then switch of the second output PMOS transistor 34 and the PMOS transistor 72.

NMOS transistor 74 can be enabled which couples the first terminal of the coil inductor 12 to the ground reference potential and can remove some excess energy from the inductor 12 if required.

Once the desired voltage of the second output 34 has been reached the comparator output 92 changes to logic high and the digital controller 40 can disable the second PMOS output transistor 82 and enable the third PMOS output transistor 84. The third output 36 can be coupled to the second terminal of the inductor 12 and the voltage at the third output can rise to a desired level determined by a reference voltage input to the third comparator 94. Once the desired voltage at the third output 36 has been reached the comparator output 94 will go high and the digital controller 40 can switch off the third PMOS transistor 84. If there is still energy in the system, the controller can switch on NMOS transistor 78 such that NMOS transistor 74 and NMOS transistor 78 couple the first terminal of the inductor and the second terminal of the inductor together. The buck boost converter 700 is then in freewheel mode and any excess current can circulate around the inductor 12. During a freewheel phase, the combination of NMOS transistor 74 and NMOS transistor 78 being enabled at the same time performs the function of a freewheel switch.

The control mechanisms can be implemented in the controller using standard digital logic techniques, for example by being implemented as finite stage machines. Alternatively control algorithms can be implemented by running a sequence of instructions on a processor. The amount of current that is supplied to the inductor 12 can be controlled by the controller by varying the amount of time that the inductor 12 is coupled to the supply 10. The inductor 12 can be coupled to the voltage supply 10 when PMOS transistor 72 is enabled. The amount of current supplied to inductor 12 can be varied by monitoring the voltage level at the first terminal of inductor 12 which is coupled to the input of the current limit comparator 96. The digital controller 40 can set a reference value coupled to the reference input of the current limit comparator 96. When the value is exceeded then the comparator output goes high which indicates that the limit is too high. The digital controller 40 can then switch off the PMOS transistor 72 so that no more current can be supplied to the inductor 12 by voltage source 10 during a particular cycle.

Figure 8:
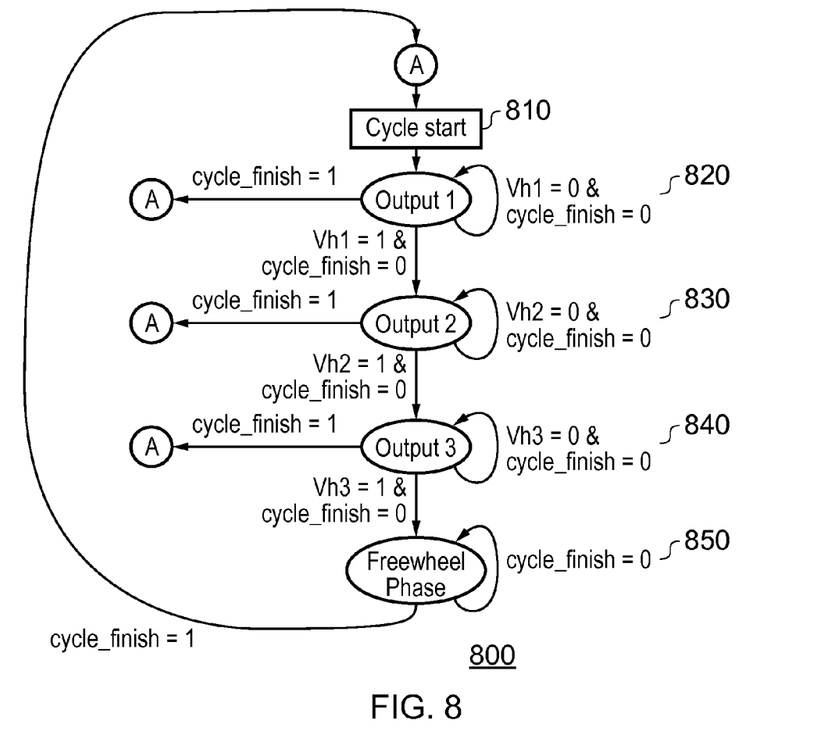
FIG. 8 shows a method of controlling the outputs of a multi-output DC-DC converter of the embodiment of FIG. 7.

FIG. 8 illustrates an algorithm for controlling the outputs of a multi output DC to DC converter. At some point after the start of the cycle 810, first output can be coupled in step 820 to an energy supply source. The energy supply source can be the inductor or can be a combination of an inductor and a voltage or current source. When a first output reaches a predetermined voltage value, the first output can be disconnected and a second output connected in step 830 to an energy supply source. When a second output has reached a desired value, a third output can be coupled in step 840 to an energy supply source which can be a voltage supply and/or energy stored in an inductor.

When all outputs have reached the desired referenced value, then the system can go into a freewheel phase in step 850 until the end of a cycle. After the end of a cycle, the sequence is repeated.

Figure 9:
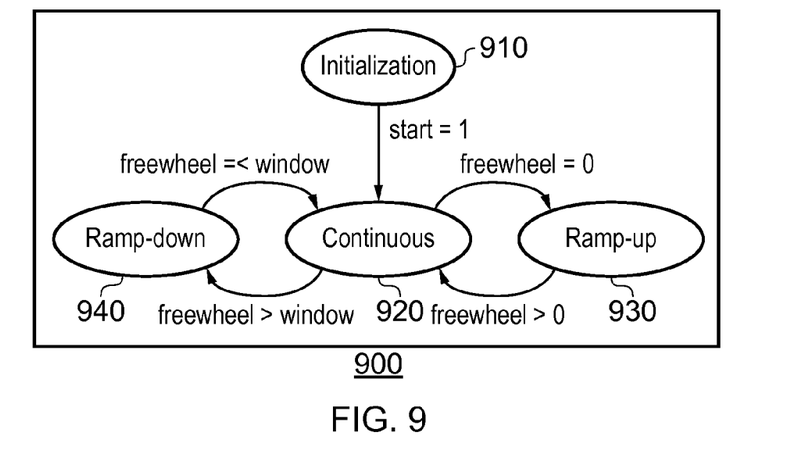
FIG. 9 shows a method of controlling the current in a multi-output DC to DC converter according to a further embodiment of the invention.

FIG. 9 shows an example method of controlling the amount of current supplied to the inductor during a cycle of operation of a multiple output of DC to DC controller. After the system initialises in 910 the system goes into a continuous mode of operation 920. In continuous mode 920 the amount of current supplied by a voltage source to the inductor in each cycle is at a constant level. The system can check the time duration of the freewheel phase in any given cycle. If the freewheel phase is equal to zero then the control goes into a ramp up mode 930. In a ramp up mode the amount of current supplied by the voltage source to an inductor is increased in each subsequent cycle. Once the duration of a freewheel phase has increased above a certain desired level, then the system can change back into continuous mode 920. In continuous mode if the freewheel phase time or duration is greater than a certain value, then this means there is too much energy in the system and so the controller changes to a ramp down mode 940. In ramp down mode 940, the amount of current supplied to the inductor in each cycle is decreased compared to a previous cycle. Once the freewheel phase time is either less than or equal to a desired value then the system changes back into a continuous mode, whereby the amount of energy supplied to an inductor in each cycle is the same as a previous cycle.

Figure 10:
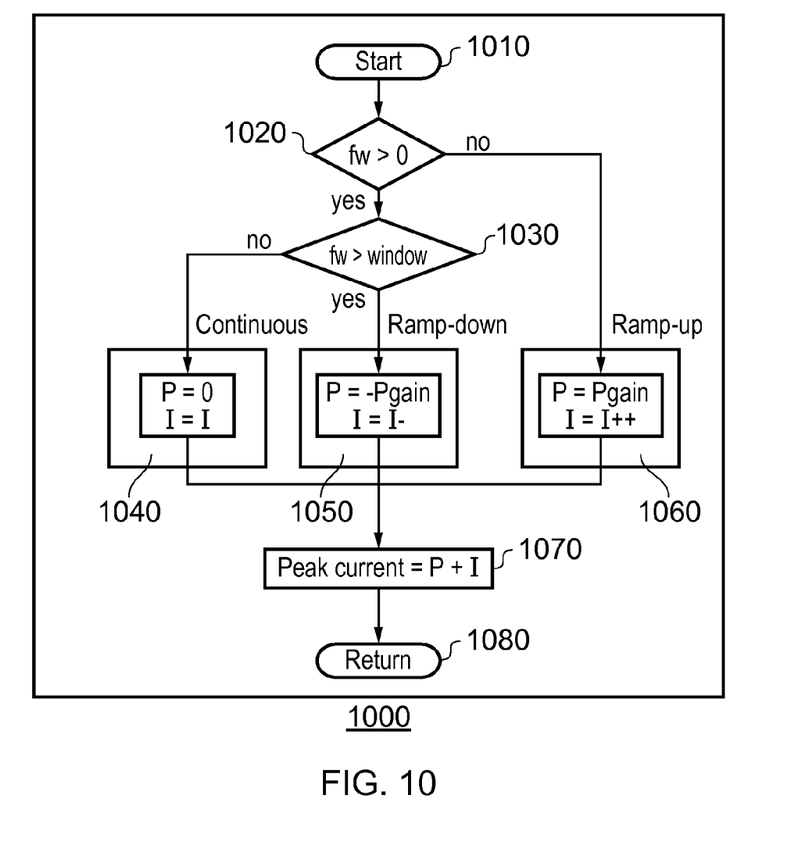
FIG. 10 illustrates a proportional integration controller according to an embodiment of the invention.

FIG. 10 shows a method of control using a proportional integration control technique which is used for when pulse switch modulation is in the control of a multi output DC to DC converter. In pulse switch modulation technique constant switching frequency is maintained but the ratio of the charge cycle to the discharge cycle can be varied. So the proportional integration control is used to adjust the charge cycle. In the charge cycle the inductor is charged by being connected to the voltage supply. A p-value of the regulator can be implemented as a logic value. This is in order to simplify the factors that need to be controlled. The p-value can be set to be the gain parameter in the ramp up mode. P-value can be set to zero in the continuous mode. P-value can be set to be a negative value of the gain in a ramp down mode. The i-value is a value which represents the increase in the factor of the i-gain for each cycle of the ramp up mode. The i-value remains constant in continuous mode. The i-value is set to decrease in a ramp-down mode.

In FIG. 10 at the start of the cycle 1010 the system first checks the value of the freewheel phase and compares it to zero in 1020.

If the value is greater than zero then the control system compares the value of the freewheel phase to a window value in 1030. Window value can be a range between two values or can be a single value.

If the freewheel phase is greater than the window value then the system goes into ramp down mode 1050, the p-value is set to be equal to the negative value of the gain parameter, and the i-value is decremented in compared to the previous cycle.

If the freewheel phase duration is less than or equal to the window value then the controller is in a continuous mode 1040, the p-value is set to zero and the i-value remains unchanged. In continuous mode 1040, the ratio of charge phase and discharge phase in each cycle will remain the same from one cycle to the next.

In 1020 if the freewheel phase is less than or equal to zero, then the controller is in a ramp up mode 1060. In ramp-up mode, the p-value is set to a positive gain and the i-value is set to increase in each cycle.

From any of continuous mode 1040, ramp down mode 1050, and ramp up mode 1060, the next step is to calculate the peak current value which is equal to the sum of the p-value and the i-value in 1070. This sets the peak current value for the system in the next cycle. The controller then returns in step 1080 to the start of the next cycle and then the sequence is repeated for each subsequent cycle of the multiple output DC to DC converter.

Example further embodiments of the multiple output DC to DC converter can have two outputs or more than three outputs by reducing or increasing the number of output switches and output capacitors.

In other embodiments the duration of the freewheel phase can be between 0 and 30% of the cycle time of the DC to DC converter, with a typical duration of between 10% to 15% of a cycle time. A window value can have a first value of 10% of a cycle time and a second value of 15% of a cycle time.

Other embodiments of the invention can have a controller operating in pulse width modulation mode with a duty cycle frequency of between 500 KHZ and 2 MHz. Further embodiments can have a clock reference frequency of between 4 and 16 times the pulse width modulation frequency.

Some embodiments of the invention can convert DC voltages from a voltage in the range of 1V to 48V to multiple output voltages in the range of 1V to 48V. Further embodiments of the invention can have higher output voltages than the input voltage. Other embodiments can supply load currents in the range of 100 uA to 1 A.

In other embodiments, the multiple-output DC-to-DC converter can be used to supply power in a motor vehicle. A motor vehicle can include but is not restricted to any of a car, van, lorry, truck, bus, coach and motorbike.

In further embodiments, the DC-to-DC converter can be used as a power supply in a mobile portable device. A mobile portable device can include but is not restricted to any of a mobile phone, PDA, MP3 player, camera, or mobile computer.

There is described a multi-output DC to DC converter having a single coil or inductor and a freewheel switch. A controller measures the duration of the freewheel phase. The controller increases the current supplied to the DC to DC converter in the following duty-cycle if the duration is less than a first value, and decreases the current supplied to the inductor in the following duty-cycle if the duration is greater than a second value.

The invention claimed is:

1. A multiple-output DC-to-DC converter operable in a continuous conduction mode comprising:
an inductor having a first inductor terminal and a second inductor terminal;
a current controller coupled to the inductor, wherein the current controller comprises a voltage source and an input switch;
a freewheel switch operable to couple the first inductor terminal to the second inductor terminal during a freewheel phase of the multiple-output DC-to-DC converter;
a plurality of output switches; and
a controller coupled to the freewheel switch, to the current controller, and to the output switches,
characterized in that the controller is operable to measure a duration of the freewheel phase and to modify a current supplied to the inductor dependent on the duration of the freewheel phase,
wherein the controller is further operable to increase a peak current supplied to the inductor by the current controller when the duration of the freewheel phase is less than a first value, and to decrease the peak current supplied to the inductor by the current controller when the duration of the freewheel phase is greater than a second value, and wherein the controller is configured to close the freewheel switch and to open the input switch and the output switches during the freewheel phase, to close the input switch and a first output switch and to open the freewheel switch, a second output switch, and a third output switch during a first phase of a cycle of the multiple-output DC-to-DC converter, and to close the input switch and to open the first, second, and third output switches and the freewheel switch during a second phase of the cycle of the multiple-output DC-to-DC converter.

2. The multiple-output DC-to-DC converter of claim 1, further comprising a selector arranged to selectively couple each of the first and second outputs to the second inductor terminal, wherein the controller further comprises at least one further controller output coupled to the selector.

3. The multiple-output DC-to-DC converter of claim 1, wherein the controller comprises a plurality of inputs, wherein each of the plurality of inputs are coupled to one of the outputs of the DC-to-DC converter.

4. The multiple-output DC-to-DC converter of claim 1, wherein the controller comprises a proportional integrating controller.

5. The multiple-output DC-to-DC converter of claim 1, wherein the freewheel switch comprises a transistor coupled between the first inductor terminal and the second inductor terminal.

6. A buck converter comprising the multiple-output DC-to-DC converter of claim 1.

7. The buck converter of claim 6, wherein the current controller comprises:
a voltage source;
a transistor having a first transistor terminal coupled to the voltage source,
a second transistor terminal coupled to the first inductor terminal, and
a third transistor terminal coupled to the second controller output.

8. A boost converter comprising the multiple-output DC-to-DC converter of claim 1.

9. The boost converter of claim 8, wherein the current controller comprises:
a voltage source coupled to the first inductor terminal;
a transistor having a first transistor terminal coupled to the second inductor terminal,
a second transistor terminal coupled to a reference potential, and a third transistor terminal coupled to the second controller output.

10. A buck-boost converter comprising the multiple-output DC-to-DC converter of claim 1.

11. The buck-boost converter of claim 9, wherein the freewheel switch comprises:
   a first transistor having a first transistor terminal coupled to the first terminal of the inductor, and a second transistor terminal coupled to a reference potential; and
   a second transistor having a first transistor terminal coupled to the second terminal of the inductor and a second transistor terminal coupled to the reference potential;
   wherein the first transistor is operable to be enabled during a first phase of a buck-boost cycle, the second transistor operable to be enabled during a second phase of the buck-boost cycle and both the first transistor and the second transistor are operable to be enabled during the freewheel phase of the buck-boost cycle.

12. A motor vehicle comprising the multiple-output DC-to-DC converter of claim 1.

13. A mobile portable device comprising the multiple-output DC-to-DC converter of claim 1.

14. A method of controlling a multiple-output DC-to-DC converter according to claim 1, the method comprising:
   determining a duration of a freewheel phase; and
   modifying the current supplied to the inductor dependent on the duration of the freewheel phase.

15. The multiple-output DC-to-DC converter of claim 1, further comprising a diode connected to the freewheel switch, to the input switch, and to the output switches of the multiple-output DC-to-DC converter through the freewheel switch, wherein an anode of the diode is connected to a fixed voltage terminal, and wherein a cathode of the diode is connected to the freewheel switch and to the buck input switch.

16. The multiple-output DC-to-DC converter of claim 1, wherein the controller is configured to open the freewheel switch, the input switch, and the first and third output switches and to close the second output switch during a third phase of the cycle of the multiple-output DC-to-DC converter.

17. The multiple-output DC-to-DC converter of claim 16, wherein the controller is configured to open the input switch, the freewheel switch, the first and second output switches and to close the third output switch during a fourth phase of the cycle of the multiple-output DC-to-DC converter.

18. A multiple-output DC-to-DC converter operable in a continuous conduction mode comprising:
   an inductor having a first inductor terminal and a second inductor terminal;
   a current controller coupled to the inductor, wherein the current controller comprises a voltage source and an input switch;
   a freewheel switch operable to couple the first inductor terminal to the second inductor terminal during a freewheel phase of the multiple-output DC-to-DC converter;
   a plurality of output switches; and
   a controller coupled to the freewheel switch, to the current controller, and to the output switches,
   characterized in that the controller is operable to measure a duration of the freewheel phase and to modify a current supplied to the inductor dependent on the duration of the freewheel phase,
   wherein the controller is further operable to increase a peak current supplied to the inductor by the current controller when the duration of the freewheel phase is less than a first value, and to decrease the peak current supplied to the inductor by the current controller when the duration of the freewheel phase is greater than a second value, and wherein the controller comprises a proportional integrating controller configured to compare the duration of the freewheel phase to a window range if the duration of the freewheel phase is greater than zero.

19. The multiple-output DC-to-DC converter of claim 18, further comprising a selector arranged to selectively couple each of the first and second outputs to the second inductor terminal, wherein the controller further comprises at least one further controller output coupled to the selector.

20. The multiple-output DC-to-DC converter of claim 18, wherein the controller comprises a plurality of inputs, wherein each of the plurality of inputs are coupled to one of the outputs of the DC-to-DC converter.

* * * * *